United States Patent
Kunliang et al.

(10) Patent No.: US 9,236,068 B2
(45) Date of Patent: Jan. 12, 2016

(54) THIN SEEDED CO/NI MULTILAYER FILM WITH PERPENDICULAR ANISOTROPY FOR READ HEAD SENSOR STABILIZATION

(71) Applicants: Zhang Kunliang, Fremont, CA (US); Li Min, Dublin, CA (US); Zhou Yuchen, San Jose, CA (US); Zheng Min, Milpitas, CA (US)

(72) Inventors: Zhang Kunliang, Fremont, CA (US); Li Min, Dublin, CA (US); Zhou Yuchen, San Jose, CA (US); Zheng Min, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 177 days.

(21) Appl. No.: 14/048,081

(22) Filed: Oct. 8, 2013

(65) Prior Publication Data

US 2014/0037989 A1 Feb. 6, 2014

Related U.S. Application Data

(62) Division of application No. 12/456,935, filed on Jun. 24, 2009, now Pat. No. 8,563,147.

(51) Int. Cl.
*G11B 5/127* (2006.01)
*G11B 5/33* (2006.01)
(Continued)

(52) U.S. Cl.
CPC ............... *G11B 5/332* (2013.01); *B82Y 10/00* (2013.01); *B82Y 25/00* (2013.01); *G11B 5/315* (2013.01); *G11B 5/3909* (2013.01);
(Continued)

(58) Field of Classification Search
None
See application file for complete search history.

(56) References Cited

U.S. PATENT DOCUMENTS

| 7,134,185 B1 | 11/2006 | Knapp et al. |
| 7,190,611 B2 | 3/2007 | Nguyen et al. |

(Continued)

FOREIGN PATENT DOCUMENTS

| EP | 0 498 089 | 8/1992 |
| JP | 05-315135 | 11/1993 |

(Continued)

OTHER PUBLICATIONS

"Prediction and Confirmation of Perpendicular Magnetic Anisotropy in Co/Ni Multilayers," by G. H. O. Daalderop et al., Physical Review Letters, vol. 68, No. 5, Feb. 3, 1992, pp. 682-685.

(Continued)

*Primary Examiner* — Kevin Bernatz
(74) *Attorney, Agent, or Firm* — Saile Ackerman LLC; Stephen B. Ackerman

(57) ABSTRACT

A hard bias (HB) structure for producing longitudinal bias to stabilize a free layer in an adjacent spin valve is disclosed and includes a composite seed layer made of at least Ta and a metal layer having a fcc(111) or hcp(001) texture to enhance perpendicular magnetic anisotropy (PMA) in an overlying $(Co/Ni)_x$ laminated layer. The $(Co/Ni)_x$ HB layer deposition involves low power and high Ar pressure to avoid damaging Co/Ni interfaces and thereby preserves PMA. A capping layer is formed on the HB layer to protect against etchants in subsequent process steps. After initialization, magnetization direction in the HB layer is perpendicular to the sidewalls of the spin valve and generates an Mrt value that is greater than from an equivalent thickness of CoPt. A non-magnetic metal separation layer may be formed on the capping layer and spin valve to provide an electrical connection between top and bottom shields.

7 Claims, 5 Drawing Sheets

(51) Int. Cl.
*B82Y 10/00* (2011.01)
*B82Y 25/00* (2011.01)
*G11B 5/39* (2006.01)
*G11B 5/31* (2006.01)
*H01L 43/12* (2006.01)

(52) U.S. Cl.
CPC ........... *G11B 5/3932* (2013.01); *G11B 5/3912* (2013.01); *G11B 2005/3996* (2013.01); *Y10T 29/49032* (2015.01); *Y10T 29/49034* (2015.01); *Y10T 29/49044* (2015.01); *Y10T 29/49067* (2015.01); *Y10T 428/115* (2015.01); *Y10T 428/1143* (2015.01); *Y10T 428/1157* (2015.01); *Y10T 428/1171* (2015.01); *Y10T 428/1193* (2015.01); *Y10T 428/12819* (2015.01)

(56) References Cited

U.S. PATENT DOCUMENTS

| | | | |
|---|---|---|---|
| 7,433,161 | B2 | 10/2008 | Ikarashi et al. |
| 7,562,436 | B2 | 7/2009 | Jayasekara |
| 7,750,627 | B2 | 7/2010 | Sasaki et al. |
| 7,804,668 | B2 | 9/2010 | Zhou et al. |
| 7,978,442 | B2 | 7/2011 | Zhang et al. |
| 8,064,244 | B2 * | 11/2011 | Zhang .................. G01R 33/098 257/421 |
| 8,174,261 | B2 | 5/2012 | Sasaki et al. |
| 8,184,411 | B2 * | 5/2012 | Zhang .................. C23C 14/165 360/324.2 |
| 8,300,356 | B2 * | 10/2012 | Zhang .................. B82Y 10/00 360/119.03 |
| 8,563,147 | B2 * | 10/2013 | Zhang .................. B82Y 10/00 360/324.12 |
| 8,734,620 | B2 * | 5/2014 | Kunliang ............... B82Y 10/00 204/192.2 |
| 8,988,822 | B2 * | 3/2015 | Zhang .................. B82Y 10/00 360/119.03 |
| 2005/0237677 | A1 | 10/2005 | Shimazawa et al. |
| 2015/0171315 | A1 * | 6/2015 | Gan .................... H01F 10/3286 257/421 |
| 2015/0194598 | A1 * | 7/2015 | Huai ..................... H01L 43/08 257/421 |

FOREIGN PATENT DOCUMENTS

| | | |
|---|---|---|
| JP | 2001-216611 | 8/2001 |
| JP | 2008-186543 | 8/2008 |

OTHER PUBLICATIONS

"Co/Ni multilayers with perpendicular magnetic anisotropy: Kerr effect and thermomagnetic writing," by F. J. A. Den Broeder et al., Appl. Phys. Lett. 61 (12) Sep. 1992, 1992 American Institute of Physics, pp. 1468-1470.

"Effect of [111] texture on the perpendicular magnetic anisotropy of Co/Ni multilayers," by V. M. Naik et al., Journal of Applied Physics, vol. 84, No. 6, Sep. 15, 1998, pp. 3273-3277.

"Magnetic and magneto-optic properties of sputtered Co/Ni multilayers," by Y. B. Zang et al., J. Appl. Phys. 75, May 15, 1994, 1994 American Institute of Physics, pp. 6495-6497.

"Perpendicular magnetic anisotropy of the epitaxial fcc Co/60-A-Ni/Cu(001) system," by Jaeyong Lee, et al., Physical Review B, vol. 56, No. 10, Sep. 1, 1997-II, pp. R5728-R5731.

"Magnetic anisotropies in Co/Ni(111) multilayers," by P. J. H. Bloemen et al., J. Appl. Phys. 72 (10), Nov. 15, 1992, 1992 American Institute of Physics, pp. 4840-4844.

"Spin-torque driven ferromagnetic resonance of Co/Ni synthetic layers in spin valves," by W. Chen et al., Applied Physics Letters 92, 012507, Jan. 2008, American Institute of Physics, pp. 012507-1 to 012507-3.

"Microwave Assisted Magnetic Recording," by Jian-Gang Zhu et al., IEEE Transactions on Magnetics, vol. 44, No. 1, Jan. 2008, pp. 125-131.

Japanese Office Action Japanese Patent Application No. 2010-143540, Apr. 2, 2015, Headway Technologies, Inc.

"Current-induced magnetization reversal in nanopillars with perpendicular anisotropy," by S. Mangin et al, nature materials/vol. 5/ Mar. 2006, www.nature.com/naturematerials, pp. 210-215.

"Effects of Ta seed layer and annealing on magnetoresistance in CoFe/Td-based pseudo-spin-valves with perpendicular anisotropy," by Randall Law et al., Applied Physics Letters 91, 242504, Published online Dec. 12, 2007, pp. 1-3.

* cited by examiner

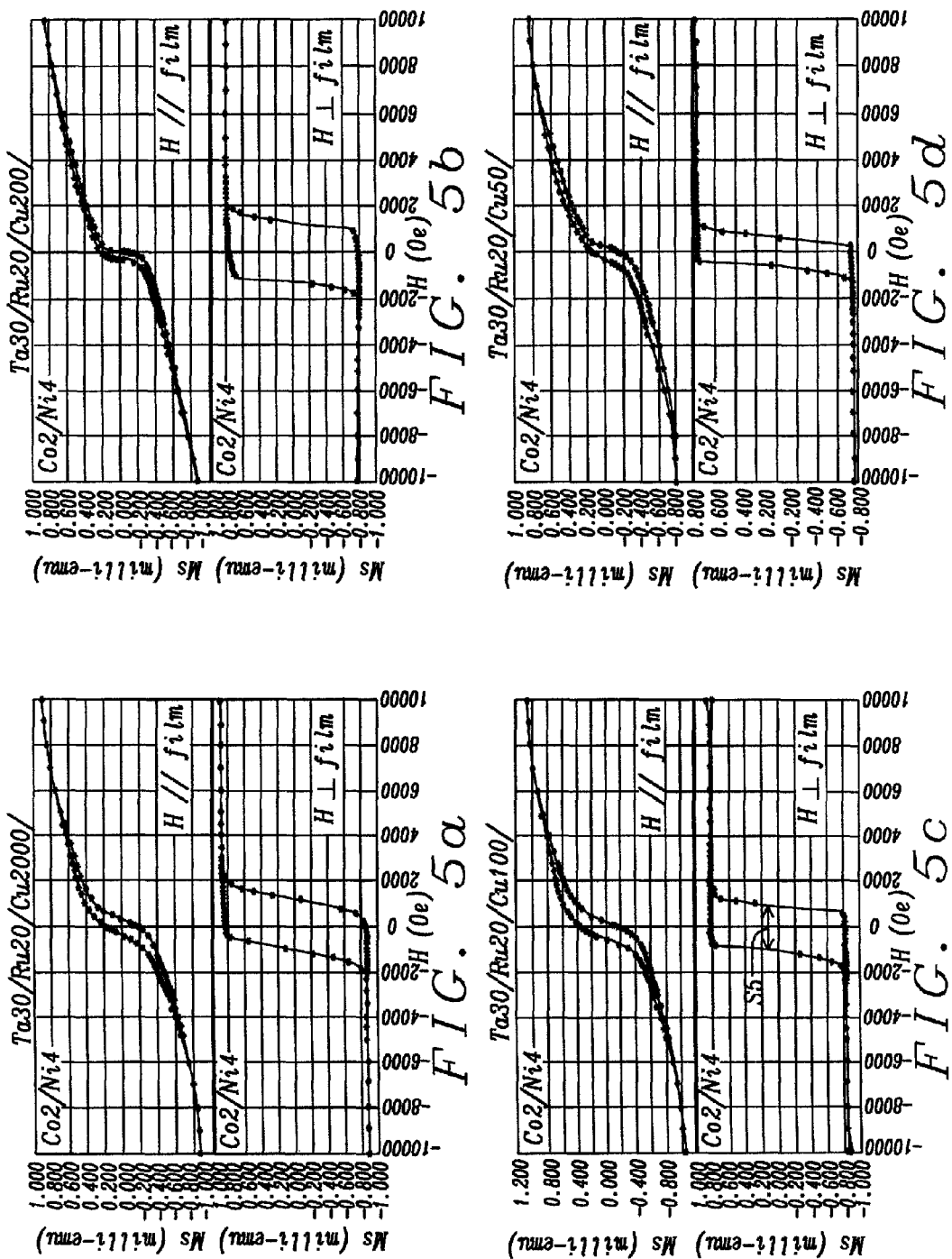

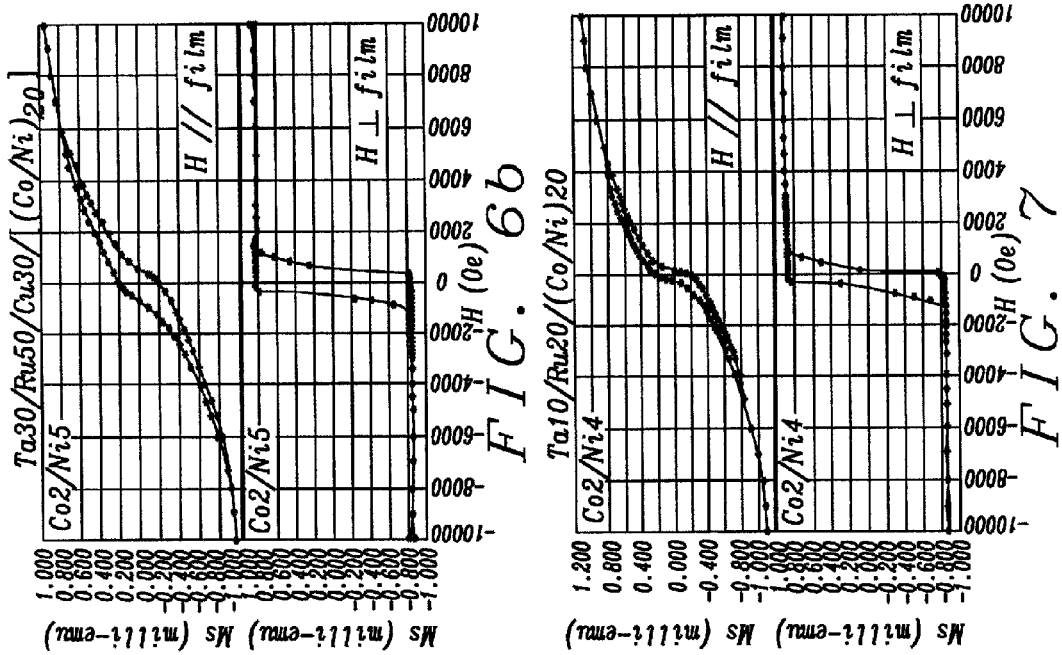
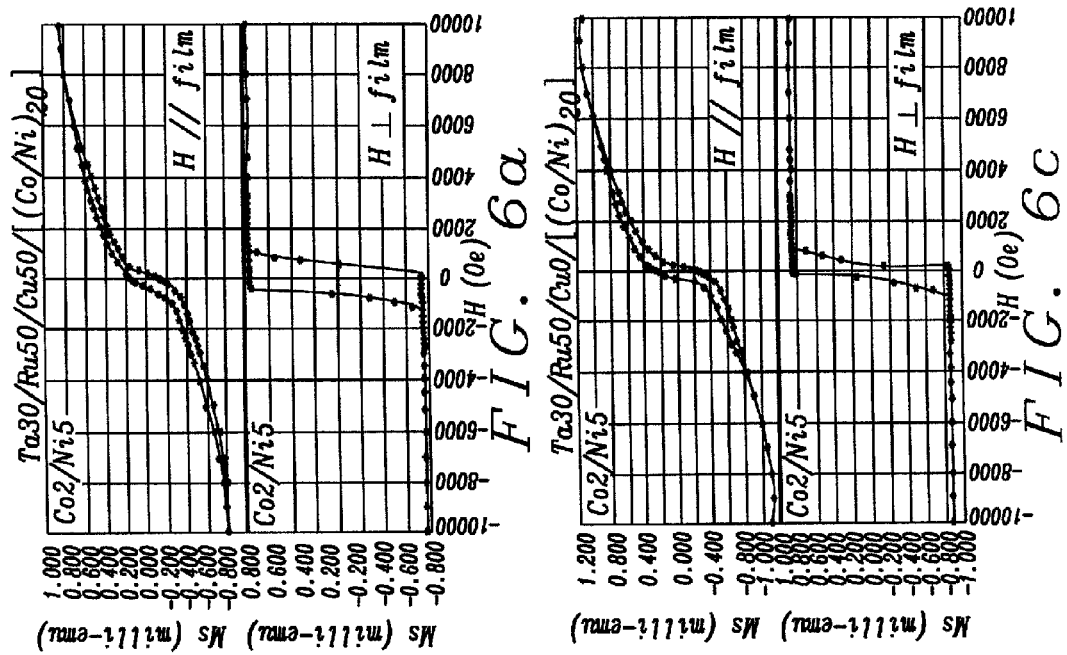

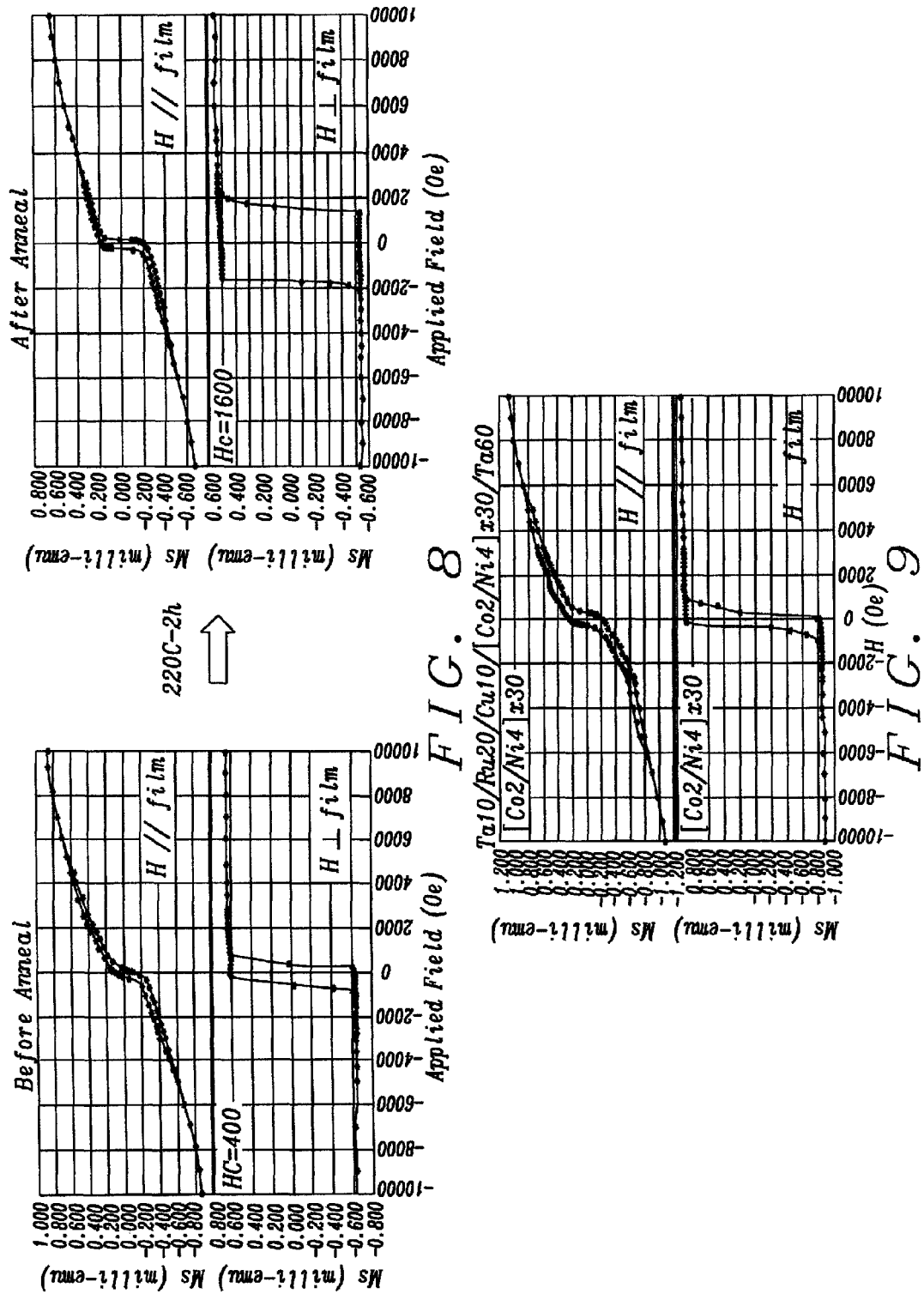

THIN SEEDED CO/NI MULTILAYER FILM WITH PERPENDICULAR ANISOTROPY FOR READ HEAD SENSOR STABILIZATION

This is a Divisional application of U.S. patent application Ser. No. 12/456,935, filed on Jun. 24, 2009, which is herein incorporated by reference in its entirety, and assigned to a common assignee.

RELATED PATENT APPLICATIONS

This application is related to the following: U.S. Pat. No. 8,064,244, and U.S. Pat. No. 7,804,668; herein incorporated by reference in their entirety.

FIELD OF THE INVENTION

The invention relates to a hard bias structure for stabilizing an adjacent read head sensor and includes a composite seed layer with (111) texture which enhances perpendicular magnetic anisotropy (PMA) in an overlying laminated Co/Ni hard bias layer.

BACKGROUND OF THE INVENTION

In a magnetic recording device in which a read head is based on a spin valve magnetoresistance (SVMR) or a giant magnetoresistance (GMR) effect, there is a constant drive to increase recording density. One method of accomplishing this objective is to decrease the size of the sensor element in the read head that is suspended over a magnetic disk on an air bearing surface (ABS). The sensor is a critical component in which different magnetic states are detected by passing a sense current through the sensor and monitoring a resistance change. A popular GMR configuration includes two ferromagnetic layers which are separated by a non-magnetic conductive layer in the sensor stack. One of the ferromagnetic layers is a pinned layer wherein the magnetization direction is fixed by exchange coupling with an adjacent anti-ferromagnetic (AFM) pinning layer. The second ferromagnetic layer is a free layer wherein the magnetization vector can rotate in response to external magnetic fields. In the absence of an external magnetic field, the magnetization direction of the free layer is aligned perpendicular to that of the pinned layer by the influence of hard bias layers on opposite sides of the sensor stack. When an external magnetic field is applied by passing the sensor over a recording medium on the ABS, the free layer magnetic moment may rotate to a direction which is parallel to that of the pinned layer. Alternatively, in a tunneling magnetoresistive (TMR) sensor, the two ferromagnetic layers are separated by a thin non-magnetic dielectric layer.

A sense current is used to detect a resistance value which is lower when the magnetic moments of the free layer and pinned layer are in a parallel state. In a CPP configuration, a sense current is passed through the sensor in a direction perpendicular to the layers in the sensor stack. Alternatively, there is a current-in-plane (CIP) configuration where the sense current passes through the sensor in a direction parallel to the planes of the layers in the sensor stack.

Ultra-high density (over 100 Gb/in$^2$) recording requires a highly sensitive read head in which the cross-sectional area of the sensor is typically smaller than 0.1×0.1 microns at the ABS plane. Current recording head applications are typically based on an abutting junction configuration in which a hard bias layer is formed adjacent to each side of a free layer in a GMR spin valve structure. As the recording density further increases and track width decreases, the junction edge stability becomes more important so that edge demagnification in the free layer needs to be reduced. In other words, horizontal (longitudinal) biasing is necessary so that a single domain magnetization state in the free layer will be stable against all reasonable perturbations while the sensor maintains relatively high signal sensitivity.

In longitudinal biasing read head design, films of high coercivity material are abutted against the edges of the sensor and particularly against the sides of the free layer. In other designs, there is a thin seed layer between the hard bias layer and free layer. By arranging for the flux flow in the free layer to be equal to the flux flow in the adjoining hard bias layer, the demagnetizing field at the junction edges of the aforementioned layers vanishes because of the absence of magnetic poles at the junction. As the critical dimensions for sensor elements become smaller with higher recording density requirements but sensor layer thickness decreases at a slower rate, the minimum longitudinal bias field necessary for free layer domain stabilization increases.

Imperfect alignment with a hard magnetic thin film such as a free layer can give rise to hysteresis or non-linear response of the sensor and thus noise. In general, it is desirable to enhance the coercivity of the hard bias film so that the stray field created by the recording medium will not destroy the magnetic alignment of the free layer. A high coercivity in the in-plane direction is needed in the hard bias layer to provide a stable longitudinal bias that maintains a single domain state in the free layer and thereby avoids undesirable Barkhausen noise. This condition is realized when there is a sufficient in-plane remnant magnetization ($M_r$) from the hard bias layer which may also be expressed as $M_r$t since hard bias field is also dependent on the thickness (t) of the hard bias layer. $M_r$t is the component that provides the longitudinal bias flux to the free layer and must be high enough to assure a single magnetic domain in the free layer but not so high as to prevent the magnetic field in the free layer from rotating under the influence of a reasonably sized external magnetic field. Moreover, a high squareness (S) hard bias material is desired. In other words, $S=M_r/M_S$ should approach 1 where $M_S$ represents the magnetic saturation value of the hard bias material.

Longitudinal hard bias structures based on CoPt or CoPtX (X=Cr, B, Ta, etc.) have been commonly used in read head sensor stabilization. However, as the track-width of the sensor becomes smaller and smaller toward higher density recording, the biasing efficiency from the longitudinal hard bias structure tends to abate. One reason for the decreased efficiency is because the easy axes of the CoPt magnetic grains tend to distribute randomly in the vicinity of the narrow junction. In a previous Headway application (U.S. Patent Appl. 2008/0117552), we disclosed PMA materials such as CoCrPt or CoCrPtX where X may be B, O or other elements that can assist a perpendicular growth of the hard bias easy axis to achieve better longitudinal biasing in TMR or CPP-GMR sensors.

Materials exhibiting PMA such as CoPt, CoPt—SiO$_2$, Tb(Fe)Co, and FePt have been reported multiple times in publications. However, all of the literature examples suffer from at least one drawback. It is preferred that establishing a PMA property in a spin valve structure does not require strenuous heating. Unfortunately, FePt or Tb(Fe)Co need high temperature annealing to achieve high enough PMA which is unacceptable for device integration since certain components are damaged by high temperatures. CoPt and its alloys such as CoCrPt and CoPt—SiO$_2$ are not desirable since a thick seed layer is required to establish a large enough PMA to stabilize a free layer in an adjacent spin valve element. That leaves the novel magnetic multilayer systems such as Co/X where X=Pt, Pd, Au, Ni, Ir, and the like for consideration. As stated above, Co/Pt, Co/Pd, and Co/Ir will not be good PMA materials since they require a thick and expensive seed layer made of Pt, Pd, and Ir. Furthermore, Co/Pt, Co/Pd, and Co/Ir configurations typically have small magnetic moments due to the inclusion of Pt, Pd, or Ir which are non-magnetic elements. Au is associated with high cost and easy interdiffusion to adjacent layers which makes a Co/Au multilayer for PMA purposes less practical. On the other hand, a Co/Ni multilayer configuration as a PMA material candidate has several advantages including (a) much higher spin polarization from Co, Ni, and Co/Ni interfaces, (b) better stability from the robustness of Ni layer insertion, (c) much higher saturation magnetization of 1 Tesla or about 2× higher than other Co/M combinations (M=metal), and (d) low cost.

Several attempts disclosed in the literature have been made in order to achieve high PMA from Co/Ni multilayer configurations. However, all of the examples typically involve a very thick underlayer to establish PMA. For instance, G. Daalderop et al. in "Prediction and Confirmation of Perpendicular Magnetic Anisotropy in Co/Ni Multilayers", Phys. Rev. Lett. 68, 682 (1992) and F. den Broeder et al. in "Co/Ni multilayers with perpendicular magnetic anisotropy: Kerr effect and thermomagnetic writing", Appl. Phys. Lett. 61, 1648 (1992), use a 2000 Angstrom thick Au seed layer. In V. Naik et al., "Effect of (111) texture on the perpendicular magnetic anisotropy of Co/Ni multilayers", J. Appl. Phys. 84, 3273 (1998), and in Y. Zhang et al., "Magnetic and magneto-optic properties of sputtered Co/Ni multilayers", J. Appl. Phys. 75, 6495 (1994), a 500 Angstrom Au/500 Angstrom Ag composite seed layer is employed. Jaeyong Lee et al. in "Perpendicular magnetic anisotropy of the epitaxial fcc Co/60-Angstrom-Ni/Cu(001) system", Phys. Rev. B 57, R5728 (1997) describe a 1000 Angstrom thick Cu seed layer. A 500 Angstrom Ti or 500 Angstrom Cu seed layer with heating to 150° C. is used by P. Bloemen et al. in "Magnetic anisotropies in Co/Ni (111) multilayers", J. Appl. Phys. 72, 4840 (1992). W. Chen et al. in "Spin-torque driven ferromagnetic resonance of Co/Ni synthetic layers in spin valves", Appl. Phys. Lett. 92, 012507 (2008) describe a 1000 Angstrom Cu/200 Angstrom Pt/100 Angstrom Cu composite seed layer.

The aforementioned thick seed layers are not practical with Co/Ni multilayer PMA configurations in spintronic devices. Typically, there is a space restriction in a direction perpendicular to the planes of the spin valve layers in advanced devices in order to optimize performance. The distance between the substrate and top surface of the spin valve tends to shrink in devices with higher areal density. Likewise, the thickness of the hard bias structure adjacent to the spin valve must decrease since it is under similar space restrictions. Seed layers thicker than about 100 Angstroms will require thinning the hard bias layer to maintain a certain thickness for the hard bias structure which can easily lead to lower PMA and less effective biasing because of the Mrt relationship. In other words, it is preferable to thin the seed layer and maintain a maximum thickness in the hard bias layer for optimum longitudinal biasing efficiency. Therefore, an improved seed layer is needed that is thin enough to be compatible with high areal density devices and yet can induce high PMA in an overlying Co/Ni multilayer in a hard bias structure.

In other prior art references, U.S. Patent Application 2007/0026538 describes a hard bias layer made of CoNi but does not include a seed layer. U.S. Pat. No. 7,134,185 discloses a CoNi hard bias layer which is formed on a Cr or NiAl seed layer. There is no mention in either of the aforementioned references of laminated Co and Ni layers with PMA.

In U.S. Pat. No. 7,433,161, a hard bias structure including a Cr, Ti, Mo, or WMo underlayer, a CoPt or CoCrPt alloy as a hard bias layer, and a Ta interlayer on the hard bias layer is described.

SUMMARY OF THE INVENTION

One objective of the present invention is to provide a thin seed layer for a laminated $(R1/R2)_x$ hard bias (HB) layer where x is an integer, R1 is Co or CoFe, and R2 is Ni, NiFe, or NiCo that fully establishes the perpendicular magnetic anisotropy (PMA) in the overlying $(R1/R2)_x$ stack without requiring a heat treatment that could degrade other components in an adjacent spin valve element.

A second objective of the present invention is to provide a hard bias structure comprised of a thin seed layer and overlying $(R1/R2)_x$ hard bias layer that achieves high Hk of over 15000 Oe, a squareness of nearly 1, and an Mrt value higher than that of a CoPt layer with the same thickness.

A third objective of the present invention is to provide a method of forming a laminated $(R1/R2)_x$ stack in a hard bias structure so the face centered cubic (fcc) (111) super lattice in the R1 and R2 layers and the interface between adjacent R1 and R2 layers is preserved.

According to one embodiment, these objectives are realized by first providing a spin valve element (TMR or CPP-GMR sensor) on a substrate such as a bottom shield in a read head. The spin valve element has a top surface and sidewalls that connect the top surface to the substrate. In one aspect there is an isolation layer made of metal oxide, metal nitride, or metal oxynitride formed on the substrate and along the sidewalls of the spin valve element. Above the isolation layer is a hard bias structure comprised of a composite seed layer and a $[R1(t1)/R2(t2)]_x$ (laminated HB layer formed on the seed layer where x is from about 10 to 70 depending on the Mst requirement, and t1 and t2 are the thicknesses of the R1 and R2 layers, respectively. Thus, there are horizontal sections of the seed layer formed on portions of the isolation layer which lie in a plane parallel to the substrate. Further, there are sloped sections of the seed layer formed along a plane that is parallel to the sloped sidewalls of the sensor. In the laminated HB layer, each of the R1 layers has a thickness (t1) from 0.5 to 5 Angstroms and each of the R2 layers has a thickness (t2) of 2 to 10 Angstroms where t2 is preferably greater than t1. The seed layer preferably has a Ta/M1/M2 or Ta/M1 configuration where M1 is a metal such as Ru having a fcc(111) or (hcp) hexagonal closed packed (001) crystal orientation, and M2 is Cu, Ti, Pd, W, Rh, Au, or Ag. In the case of Pd, Au, and Ag, the M2 layer thickness is kept to a minimum in order to reduce cost. Ta and M1 layers in the composite seed layer are critical for enhancing the (111) texture in overlying HB layers.

A key feature is growth of the laminated HB layer on the seed layer such that the easy axis of the laminated HB layer is oriented perpendicular to the seed layer. Following HB initialization, HB magnetization near the sensor will be along the easy axis and perpendicular to the nearby sidewall of the sensor, resulting in surface charges as close as possible to the free layer. Body charges in regions of the HB layer along horizontal sections of seed layer are not significant and only charges from grains formed on sloped seed layer sections along the sloped sensor sidewalls are major contributors to the hard bias field.

Above the hard bias layer is a capping layer that is preferably made of Ta. The capping layer serves to protect the hard bias structure from subsequent process steps that may involve a chemical mechanical polish (CMP) process, an ion beam etch, or other etches. A non-magnetic separation layer made of a metal such as Ru is formed on the capping layer and contacts the top surface of the sensor element. A top shield is disposed on the non-magnetic separation layer and serves as a top lead that is electrically connected to the bottom shield (bottom lead) through the non-magnetic separation layer and sensor element.

An important feature of all embodiments is that each of the R1 and R2 layers in the $(R1/R2)_x$ laminate is deposited with a very low RF power and a high inert gas pressure to minimize the impinging ion energy so that deposition of a layer does not damage the R1 or R2 layer on which it is formed. Thus, in an example where R1 is Co and R2 is Ni, the interfaces between the Co and Ni layers are preserved to maximize the PMA property. Furthermore, this method enables the PMA of $(Co/Ni)_x$ or $(R1/R2)_x$ laminates to be preserved with a substantially thinner seed layer. The isolation layer and all layers in the hard bias structure may be formed in a magnetron sputtering system containing deposition chambers and at least one oxidation chamber. After the capping layer is deposited, the top surface of the hard bias structure may be planarized such that a portion of the capping layer and hard bias layer proximate to the sensor sidewalls is essentially coplanar with the top surface of the sensor element.

BRIEF DESCRIPTION OF THE DRAWINGS

FIGS. 5a-5d are MH curves showing how the Cu thickness in a Ta/Ru/Cu composite seed layer affects the PMA in an overlying $(Co/Ni)_{20}$ multilayer structure.

FIGS. 6a-6c are plots with MH curves showing how the Cu layer in a Ta/Ru/Cu composite seed layer can be thinned or removed while still preserving the PMA in an overlying $(Co/Ni)_x$ laminated structure according to one embodiment of the present invention.

FIG. 7 is a plot with MH curves illustrating how the Ta and Ru layers in the Ta/Ru composite seed layer in FIG. 6c can be thinned while still maintaining PMA in an overlying Co/Ni laminated structure according to an embodiment of the present invention.

FIG. 8 is a plot with MH curves showing the effect of annealing on the PMA in a Ta30/Ru50/Cu100/[Co(2)/Ni(5)]$_{20}$ multilayer hard bias structure with a Ru10/Ta40/Ru30 capping layer formed according to an embodiment of the present invention.

FIG. 9 is a plot with MH curves for a Ta10/Ru$^{20}$/Cu10/[Co2/Ni4]×30 hard bias structure with a Ta capping layer according to one embodiment of the present invention.

DETAILED DESCRIPTION OF THE INVENTION

Figure 1:
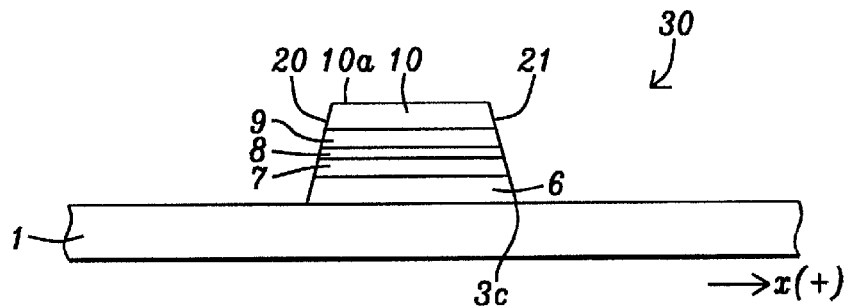
FIG. 1 is a cross-sectional view showing a spin valve structure formed on a substrate according to one embodiment of the present invention.

The present invention is a hard bias structure for providing longitudinal bias to a free layer in an adjacent CPP-GMR or TMR spin valve structure and includes a thin composite seed layer formed on a substrate and a $(R1/R2)_x$ laminated hard bias layer with perpendicular magnetic anisotropy. PMA is fully established with a thin composite seed layer comprised of a lower Ta layer and an upper metal layer with fcc(111) or hcp(001) crystal orientation for enhanced performance. The present invention also includes a method of depositing the $(R1/R2)_x$ laminated hard bias layer such that the R1/R2 interfaces are well preserved and only a thin seed layer is required for establishing the desired fcc(111) orientation. Drawings are provided by way of example and are not intended to limit the scope of the invention.

In principle, the magnetic anisotropy of a hard bias layer such as a $(Co/Ni)_x$ laminated structure arises from the spin-orbit interactions of the 3d and 4s electrons of Co and Ni atoms. Such interaction causes the existence of an orbital moment which is anisotropic with respect to the crystal axes which are in (111) alignment, and also leads to an alignment of the spin moment with the orbital moment. In $(Co/Ni)_x$ laminated structures, it is essential to have a fcc (111) superlattice in order to establish PMA. As mentioned previously, prior art structures rely on assistance from a thick seed layer having a perfect fcc structure such as Au, Au/Ag, Ti, Cu, and Au/Cu to establish PMA in a $(Co/Ni)_x$ multilayer configuration. In the G. Daalderop and F. den Broeder references mentioned previously, it is believed that the PMA effect is established by the presence of an interface between ultra-thin layers of closed packed Co and Ni atoms. Since Co and Ni differ only by one valence electron, the existence of Co and Ni interfaces will give rise to a large magnetic anisotropy.

In the present invention, we have discovered a method for depositing R1 and R2 layers that preserves the interfaces of the laminated R1 and R2 layers thereby requiring a substantially thinner seed layer for hard bias structures. Moreover, once the number of laminations (x) in a $(Co/Ni)_x$ layer, for example, disclosed herein reaches a large enough number between about 10 and 70, there is a sufficient quantity of Co and Ni valence electrons to generate a high PMA from the spin-orbit interactions and thereby stabilize a free layer in an adjacent spin valve structure. In one aspect, a composite seed layer represented by Ta/M1 where M1 is an upper metal layer having a fcc(111) or hcp(001) crystal orientation such as Ru, Cu, or Au provides an additional advantage of enhancing the (111) texture in an overlying hard bias structure thereby optimizing the PMA in the laminated hard bias layer.

First, various embodiments of a $(R1/R2)_x$ hard bias structure having high PMA according to the present invention will be described and then a method for forming a $(Co/Ni)_x$ laminated structure which preserves the Co/Ni interfaces will be provided.

Referring to FIG. 1, a portion of a sensor stack in a read head structure 30 is shown as viewed from an air bearing surface (ABS) plane. A bottom shield 1 made of permalloy, for example, is formed on a substrate (not shown) that is typically ceramic and a patterned spin valve element (sensor) is formed on the bottom shield by a well known method. According to the exemplary embodiment of the present invention, the sensor is a bottom spin valve having a bottom layer 6 comprised of a composite such as a seed layer contacting the bottom shield 1 and an AFM layer formed on the seed layer. Seed and AFM layers are not shown to simplify the drawing. Above the bottom layer 6 is sequentially formed a reference layer 7, a non-magnetic spacer or tunnel barrier 8, a free layer 9, and a capping layer 10. Capping layer 10 may be a composite made of two or more layers and may include an upper layer that serves as a hard mask during patterning of the sensor stack of layers to form a spin valve element. The compositions of the layers within the sensor are not described because the present invention encompasses all materials used to fabricate layers therein and which are well known to those skilled in the art. The sensor has a top surface 10a, a sidewall 20 along a first side, and a second sidewall 21 along a side opposite to the first side. From a top-down view (not shown), the top surface 10a of the sensor may appear as a circle, ellipse, or a polygonal shape.

In another embodiment (not shown), the spin valve element may be a top spin valve or a dual spin valve as appreciated by those skilled in the art. At least one free layer in the top spin valve or dual spin valve will require stabilization by a hard bias structure of the present invention.

Figure 2:
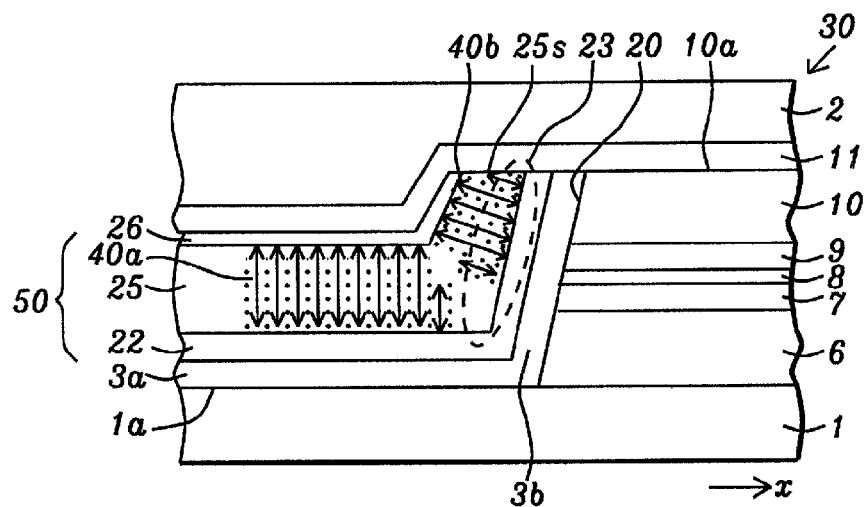
FIG. 2 is cross-sectional view of a hard bias structure formed adjacent to a sidewall in the spin valve shown in FIG. 1 wherein the arrows in the hard bias layer indicate the easy axes orientation according to a first embodiment of the present invention.

Referring to FIG. 2, an isolation layer 3 made of AlOx or another dielectric material has sections 3a and 3b formed on the bottom shield 1 and along sidewall 20 (and 21), respectively. There is a thin composite seed layer 22 (individual layers not shown) disposed on the isolation layer 3. A key feature is the composite seed layer 22 has a fcc(111) lattice and may be comprised of a Ta/Ru/Cu configuration where a lower Ta layer having a thickness of 5 to 100 Angstroms contacts isolation layer 3, a middle Ru layer about 10 to 100 Angstroms thick is formed on the Ta layer, and an upper Cu layer 1 to 100 Angstroms thick is formed on the Ru layer. In another aspect, the upper Cu layer may be removed and a Ta/Ru composite seed layer 22 is employed wherein the Ta and Ru layers have thicknesses of 5 to 100 Angstroms, and 10 to 100 Angstroms, respectively. Optionally, Ru may be replaced by a metal M1 layer having a fcc(111) or hcp(001) lattice structure.

In another embodiment, the upper Cu layer in the composite seed layer 22 may be replaced by a metal M2 such as Ti, Pd, W, Rh, Au, Ag, or the like with a thickness for M2 of from 1 to 100 Angstroms to give a Ta/M1/M2 configuration where M1 is unequal to M2. However, it is critical that the composite seed layer 22 be comprised of a lower Ta layer and at least one metal layer having fcc(111) or hcp(001) crystal orientation on the Ta layer to enhance the (111) crystal structure in an overlying $(R1/R2)_x$ laminated layer and enhance the PMA therein. In another embodiment, the composite seed layer may comprise NiCr and at least one of Ta and Ru.

Above the composite seed layer 22 is a hard bias layer 25 that preferably has a $(R1/R2)d_x$ laminated structure where R1 is Co or CoFe, R2 is Ni, NiFe, or NiCo, and x is between about 10 and 70 depending on the Mst requirement. Preferably, CoFe has a composition represented by $Co_{(100-w)}Fe_w$ where w is from 0 to 90 atomic %, NiFe has a composition represented by $Ni_{(100-y)}Fe_y$ where y is from 0 to 50 atomic %, and NiCo has a composition represented by $Ni_{(100-z)}Fe_z$ where z is from 0 to 50 atomic %. Each of the plurality of R1 layers in the laminated hard bias layer 25 has a thickness from 0.5 to 5 Angstroms, and preferably between 1.5 to 3 Angstroms. Each of the plurality of R2 layers in the laminated hard bias layer has a thickness from 2 to 10 Angstroms, and preferably between 3.5 and 8 Angstroms. Preferably, the thickness t2 of a R2 layer is greater than a R1 layer thickness t1, and more preferably, t2~2X t1 in order to optimize the spin orbit interactions between adjacent R1 and R2 layers. In addition, R1 and R2 layers are preferably deposited by a method that preserves the R1/R2 interfaces as described in a later section. In one aspect, when t1 is less than or equal to about 2 Angstroms, the R1 layer may be considered as a "close-packed" layer and not necessarily having a (111) crystal orientation.

FIG. 2 also depicts arrows 40a representing the easy axis of HB grains formed on the seed layer 22 above isolation layer 3a and arrows 40b representing the easy axis of HB grains formed on the seed layer above isolation layer 3b. With the easy axes 40a, 40b oriented perpendicular to the underlying seed layer 22, initialization of the HB layer 25 can be achieved by applying a strong in-plane longitudinal field along the x-axis direction (left to right) that overcomes the anisotropy field of the HB material and aligns the HB magnetization in the same direction as the applied field. Once the field is withdrawn, the magnetizations of the HB grains relax to the uniaxial easy axis direction that has a smaller angle to the longitudinal direction. HB initialization preferably occurs after atop shield 2 has been formed. For HB grains grown along the sidewall 20, the magnetization will be in the direction along the easy axis direction but pointing toward the sidewall 20. Therefore, the charges (not shown) from the HB layer 25 are mainly surface charges from these edge grains inside region 23. This charge placement is actually the best situation for generating a strong HB field in the sensor stack and free layer 9 because the charges are at the closest position to the sensor stack (sidewall 20) and the solid angle (not shown) from the charges is maximized.

For HB grains grown above isolation layer 3a, their easy axis is perpendicular to the top surface 1a of the bottom shield 1 as indicated by arrows 40a and the orientation of the magnetization is theoretically random after HB initialization. Charges will be formed near the interface of HB layer 25 with seed layer 22 and capping layer 11 in regions above isolation layer 3a. Random magnetization is not a concern in these regions, however, since the solid angles formed by grains therein relative to the free layer 9 are much smaller than those grown above isolation layer 3b near sidewall 20. Therefore, the charges in the HB layer 25 above isolation layer 3a will be much smaller than the surface charges in region 23. A second consideration regarding random magnetization is that if the sensor stack and particularly the free layer 9 is positioned near the center plane (not shown) of the HB layer 25, the field from the net charge, if any, on the top and bottom surfaces of the HB layer above insulating layer 3a will cancel each other as they are exactly the opposite sign and of the same magnitude. It should be understood that the HB layer 25 on the opposite side of the sensor stack has a magnetization along sidewall 21 (FIG. 3) that is equal to the magnetization at sidewall 20 but pointing in a direction away from sidewall 21.

It is reasonable to think that the HB regions where the two different easy axis growth patterns meet will be an area where an amorphous phase may arise and cause variations in the HB field. However, this hard bias scheme does not depend on body charges to generate an HB field in the free layer 9. Moreover, the HB layer 25 thickness can be greatly reduced to minimize the effect of the amorphous phase in a region where arrows 40a and 40b intersect.

The uppermost layer in the hard bias structure is a capping layer 26. In one aspect, the capping layer 11 is comprised of Ta with a thickness in the range of 40 to 80 Angstroms. Alternatively, the capping layer may include Ta and at least one layer of Ru as in a Ru/Ta/Ru configuration. Ru may be employed because of its oxidation resistance. Ta is preferred because it offers good protection against wet etchants and dry etchants in subsequent processing steps such as a CMP process or an ion beam etching (IBE) step. Optionally, other capping layer materials used in the art may be used as capping layer 26. Note that a top portion of composite seed layer 22, a top surface 25s of hard bias layer 25 formed along sidewall 20, and a portion of capping layer 26 are essentially coplanar with top surface 10a of the spin valve element.

There is a non-magnetic separation layer 11 made of Ru or the like formed on top surface 10a, top surface 25s, and on the capping layer 26 to prevent a magnetic interaction between top shield 2 and hard bias layer 25. Non-magnetic separation layer 11 forms an excellent electrical connection between top shield 2 and capping layer 10 in the sensor element. In one embodiment, non-magnetic separation layer 11 is not planar and instead conforms to the shape of underlying layers. For example, a portion of non-magnetic separation layer 11 above top surface 10a and top surface 25a is a greater distance from bottom shield 1 than portions formed above sections of hard bias layer 25 having easy axes 40a.

Next, a top shield 2 may be formed on the non-magnetic separation layer 11 by a conventional method. Top shield 2 may be made of the same permalloy as in bottom shield 1.

Figure 3:
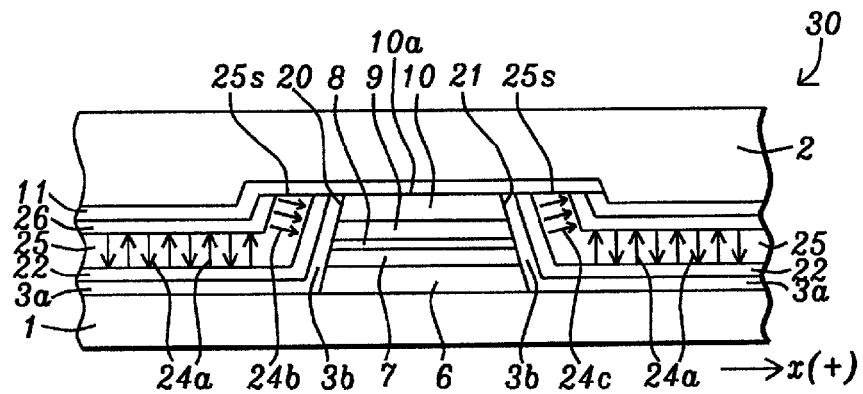
FIG. 3 is cross-sectional view of the hard bias structure in FIG. 2 in which the arrows indicate the longitudinal biasing direction of the hard bias layer after the hard bias layer is initialized according to an embodiment of the present invention.

Referring to FIG. 3, the magnetization in hard bias layer 25 proximate to sidewall 20 is depicted by arrows 24b and proximate to sidewall 21 by arrows 24c following hard bias initialization along the (+)x axis direction. Magnetization 24c is perpendicular to sidewall 21 but points away from the sidewall. The magnetization 24b, 24c in hard bias layer 25 provides essentially all of the longitudinal biasing to free layer 9. Note that magnetization 24a in hard bias layer 25 above horizontal sections of isolation layer 3a is random and does not contribute to free layer stabilization.

With regard to a process of forming the hard bias structures in the aforementioned embodiments, the isolation layer 3 and all of the layers in the hard bias structure 50 may be laid down in a sputter deposition system after a single pump down step. For instance, isolation layer 3, seed layer 22, hard bias layer 25, and capping layer 26 may be formed in an Anelva C-7100 thin film sputtering system or the like which typically includes physical vapor deposition (PVD) chambers, an oxidation chamber, and a sputter etching chamber. Typically, the sputter deposition process involves an argon sputter gas with ultra-high vacuum and the targets are made of metal or alloys to be deposited on a substrate. In an alternative embodiment, isolation layer 3 may be formed by a PVD or chemical vapor deposition method in a separate deposition tool.

The present invention also encompasses an annealing step after all layers in the hard bias structure have been deposited. The hard bias structure 50 may be annealed by applying a temperature between 200° C. and 280° C. for a period of 0.5 to 10 hours. No applied magnetic field is necessary during the annealing step because PMA is established due to the (111) texture in the composite seed layer 22 and due to the spin orbital interactions between R1 and R2 layers in the laminated hard bias layer 25.

An important feature of the present invention is the method for depositing the $(R1/R2)_x$ laminated hard bias layer 25. Although the following description relates to R1=Co, and R2=Ni, those skilled in the art will appreciate that the same process may be applied where R1 is CoFe and R2 is NiFe or NiCo. In particular, a lower RF power and high Ar pressure are utilized to avoid damaging the substrate on which each Co or Ni layer is deposited in order to preserve the resulting Co/Ni (R1/R2) interfaces and enhance the PMA property therein. In other words, the ion energy impinging on recently deposited Co and Ni surfaces is minimized during sputter deposition of subsequent Co and Ni layers to reduce damage from ion bombardment during the sputtering process. In one embodiment, each of the Co and Ni layers in the laminated hard bias layer 25 is laid down in a DC magnetron sputter deposition chamber by a process comprising a RF power of less than 200 Watts, and an Ar flow rate of >15 standard cubic centimeters per minute (sccm). Deposition of each Co and Ni layer requires less than a minute and total time necessary to form a $(Co/Ni)_{20}$ structure is less than about an hour.

It should be understood that a photoresist layer is initially formed on the sensor stack of layers and is patterned before serving as an etch mask while the spin valve is patterned and sidewalls defined by one or more etching steps. The photoresist mask typically remains on the patterned sensor during deposition of the isolation layer and hard bias structure 50. Furthermore, in order to achieve a uniformly thick HB layer 25 on a seed layer 22 with topography as depicted in the preferred embodiments (FIGS. 2-3), it may be necessary to perform the seed layer deposition and HB deposition in more than one step. For example, a first step may involve a high deposition angle while a second step employs a low deposition angle. To minimize the overspray, a shaper may be used in IBD systems. The present invention also anticipates that a portion of the hard bias layer or capping layer may be removed by an ion beam etch. As a result of the hard bias structure 50 deposition sequence and optional ion beam etch thereafter, top shield 2 is generally thicker in regions above HB layer 25 having easy axes 40a than above the top surface 10a and top surface 25s. Typically, the photoresist mask is removed after the HB layer 25 and capping layer 26 are formed.

Once all the layers in the hard bias structure 50 are formed, a mild CMP process may be employed to planarize the top surface 25s so that hard bias layer 25 in regions having easy axes 40b and capping layer 26 are essentially coplanar with the top surface 10a. Thereafter, a non-magnetic separation layer 11 may be deposited on the hard bias layer 25 and top surface 10a. Top shield 2 is formed on the non-magnetic separation layer by a conventional method such as a plating operation.

Example 1

An experiment was conducted to demonstrate the effectiveness of forming a $(Co/Ni)_x$ laminated hard bias layer with regard to minimizing the required thickness of the seed layer in a hard bias structure. A stack comprised of a Cu seed layer, $(Co/Ni)_{20}$ laminated layer where each Co layer is 2 Angstroms thick and each Ni layer is 4 Angstroms thick, and a Ru10/Ta40/Ru30 cap layer was fabricated in order to obtain PMA values from MH curves using a vibrating sample magnetometer (VSM). The thickness of each layer in the composite cap layer is shown by the number following each of the elements. Copper seed layer thickness was reduced from 1000 Angstroms in FIG. 4a to 500 Angstroms in FIG. 4b, 200 Angstroms in FIG. 4c, and to 100 Angstroms in FIG. 4d. The upper plot in each figure shows the horizontal to plane component of each magnetic field and the lower plot in each figure illustrates the perpendicular magnetic anisotropy (PMA) component. It should be understood that the distances $s_1$-$s_4$ between the mostly vertical sections in the lower plots are proportional to the PMA magnitude. Clearly, PMA can be maintained even with a Cu seed layer as thin as 100 Angstroms although PMA decreases somewhat as the Cu seed layer is thinned. Furthermore, from torque measurements, we deduced that Hk for each $(Co/Ni)_{20}$ stack having a 100 Angstrom thick Cu seed layer is >15000 Oersted (Oe).

Example 2

Figure 4A:
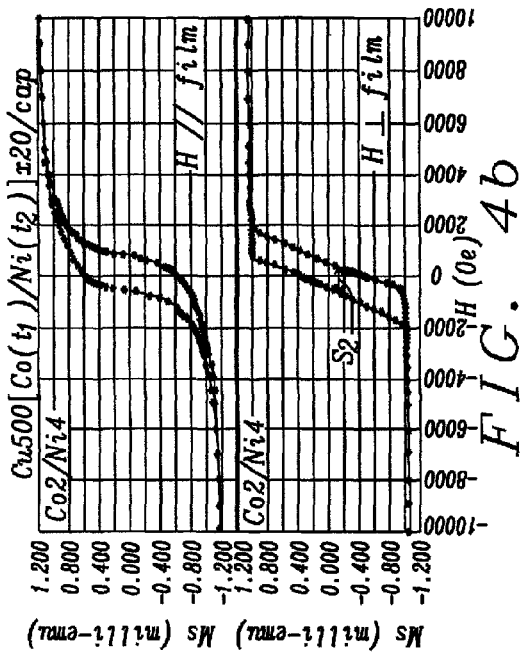
FIGS. 4a-4d are MH curves showing the effect of Cu seed layer thickness on the PMA in an overlying $(Co/Ni)_{20}$ multilayer structure.
Figure 4B:
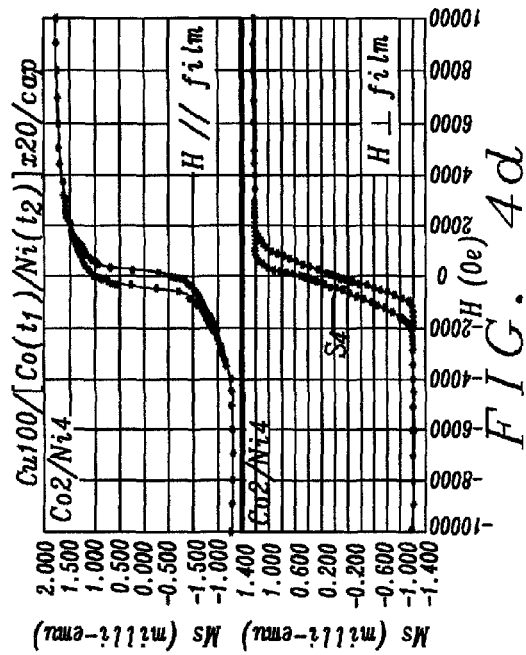
Figure 4C:
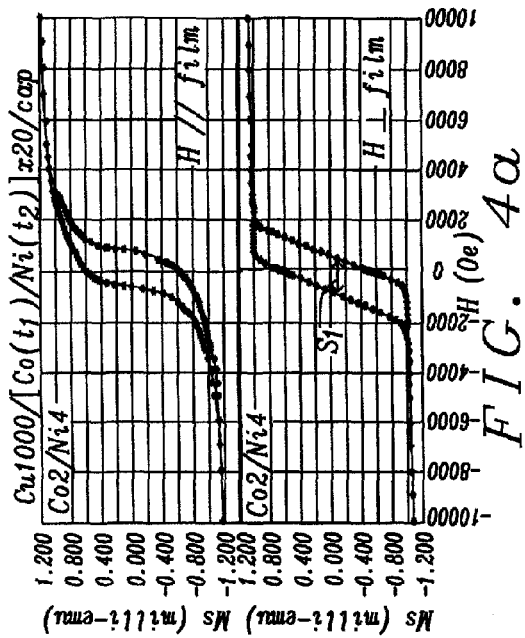
Figure 4D:
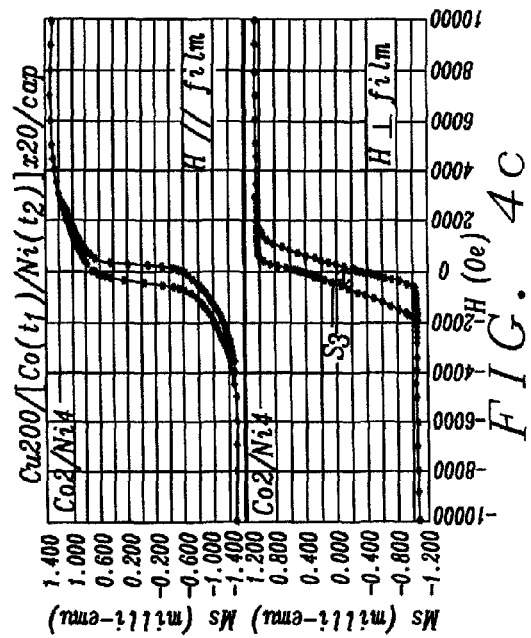

In a second experiment, a Ta/Ru underlayer was inserted to form a Ta/Ru/Cu seed layer and further enhance the (111) texture of the upper Cu layer according to an embodiment of the present invention where the seed layer is represented by Ta/M1/M2 and M1 is unequal to M2. The lower Ta layer thickness is 30 Angstroms and the middle Ru layer thickness is 20 Angstroms. The other layers in the hard bias stack have the same composition and thickness as indicated in the previous example. As a result, PMA is further improved with respect to FIGS. 4a-4d as indicated by the MH curves in FIGS. 5a-5d. Note that the distance $s_5$ in FIG. 5c is greater than $s_4$ where the Cu layer in both cases is 100 Angstroms thick and indicates larger PMA in an overlying (Co/Ni)$_x$ hard bias layer when a Ta/Ru/Cu seed layer is employed. Those skilled in the art will also recognize that the sloped portions of the curves in FIGS. 5a-5d are more vertical than the sloped portions in FIGS. 4a-4d which represents improved perpendicular magnetic properties. The thickness of the upper Cu layer in the composite seed layer is reduced from 2000 Angstroms in FIG. 5a, to 200 Angstroms in FIG. 5b, 100 Angstroms in FIG. 5c, and to 50 Angstroms in FIG. 5d. Even with a thin 50 Angstrom Cu layer (FIG. 5d), there is a PMA improvement over FIG. 4a representing the thick (1000 Angstrom) Cu seed layer. Hk is confirmed by torque measurements to be larger than 15000 Oe even with a very thin Ta30/Ru20/Cu50 seed layer.

Example 3

To further explore the effect of thinning the upper Cu layer in the composite seed layer described in Example 2, the upper Cu layer was thinned from 50 Angstroms in FIG. 6a to 30 Angstroms in FIG. 6b, and completely removed in FIG. 6c. Note that the resulting seed layer has a 30 Angstrom thick Ta layer and a 50 Angstrom thick Ru layer in the Ta/Ru configuration and represents a Ta/M1 seed layer according to another embodiment of the present invention. In addition, the thickness of each Ni layer in the (Co/Ni)$_{20}$ hard bias stack was increased slightly to 5 Angstroms. We have found that excellent PMA properties are retained in the (Co/Ni)$_{20}$ multilayer even when the Cu layer in the composite seed layer is removed as illustrated in FIG. 6c.

Example 4

A stack comprised of a Ta30/Ru50/Cu100 composite seed layer, a middle (Co/Ni)$_{20}$ laminated layer, and an upper composite Ru10/Ta40/Ru30 cap layer was annealed at 220° C. for 2 hours. No applied magnetic field during annealing is necessary to establish PMA. However, PMA does increase substantially during the annealing step as indicated in FIG. 7 where the left side of the figure depicts MH curves for parallel (upper) and perpendicular (lower) magnetic components prior to annealing and the right side of the figure shows the MH curves after the annealing process. Each of the Co layers has a 2 Angstrom thickness and each of the Ni layers has a 5 Angstrom thickness in FIG. 7. Typical Ku and Hk results from an annealed structure such as the one described above are about 5.64E+06 erg/cc and 17161 Oe, respectively.

Example 5

According to a preferred embodiment of the present invention, a hard bias structure was fabricated on an AlOx substrate to characterize the performance. The HB structure was made with the following configuration in which the value following each individual layer represents the film thickness in Angstroms: Ta10/Ru20/Cu10/[(Co2/Ni4)$_{30}$]/Ta60. In the aforementioned structure, Ta/Ru/Cu is the composite seed layer, the Co/Ni laminate is the hard bias layer, and a 60 Angstrom thick Ta layer is the capping layer. FIG. 8 illustrates a MH curve for the parallel to plane magnetic anisotropy component (upper plot) and a MH curve for the PMA component (lower plot). It is clearly shown that the PMA of the (Co/Ni)$_{30}$ laminated hard bias layer is well preserved. With Hk>15000 Oe, Mrt>2 memu/cm$^2$, and a squareness S of about 1, a good biasing effect is expected when this hard bias structure is employed for free layer stabilization in a GMR-CPP or TMR sensor. Note that the lamination number (x=30 in this example) may be increased or decreased depending on the actual free layer moment so that the optimum biasing effect can be achieved.

Example 6

According to another embodiment of the present invention, a hard bias structure including a Ta/Ru seed layer was fabricated on an aluminum oxide substrate to characterize the performance in which the value following each individual layer represents the film thickness in Angstroms: Ta10/Ru20/ [(Co2/Ni4)$_{30}$]Ta60. In this configuration, a thinner seed layer is used to further improve the biasing field by enabling the hard bias layer to comprise a greater proportion of the overall hard bias structure. The (Co/Ni)$_{30}$ laminated hard bias layer grows on the Ta/Ru seed layer such that its easy axes are aligned perpendicular to the seed layer as indicated in FIG. 2. FIG. 9 clearly shows the PMA of the (Co/Ni)$_{30}$ hard bias layer is well preserved. Again, the Hk>15000, Mrt>2 memu/cm$^2$, and squareness is about 1 for an excellent biasing effect. In comparison, a CoPt layer would require a thickness of 200 Angstroms to have an equivalent Mrt value to the 180 Angstrom thick (Co/Ni)$_{30}$ laminated layer. Actual magnitude of the biasing field may vary depending on the lamination number selected. For example, greater biasing power can be achieved by increasing the value of x or increasing the thicknesses t1, t2 of the Co and Ni layers, respectively.

We have described various embodiments of hard bias structures having a thin seed layer such as Ta/Ru or Ta/Ru/Cu with a fcc(111) lattice configuration that produces outstanding perpendicular magnetic anisotropy and longitudinal biasing strength in an overlying (Co/Ni)$_x$ laminated hard bias layer. The resulting biasing field is greater than that afforded by an equivalent thickness of CoPt or alloys thereof. Biasing strength is easily adjusted by varying the lamination number "x". A deposition method for Co and Ni films is described that preserves the Co/Ni interfaces in the hard bias laminate and thereby maintains PMA to provide optimum performance.

While this invention has been particularly shown and described with reference to, the preferred embodiment thereof, it will be understood by those skilled in the art that various changes in form and details may be made without departing from the spirit and scope of this invention.

We claim:

1. A magnetic read head, comprising:
   (a) a bottom shield having a top surface;
   (b) a sensor element having a plurality of layers including a free layer formed therein, said sensor element has a top surface, sidewalls, and contacts the top surface of the bottom shield;
   (c) a metal oxide, metal nitride, or metal oxinitride isolation layer formed on the top surface of the bottom shield in regions adjacent to the sensor element and along the sidewalls of the sensor element;
   (d) a composite seed layer including at least a lower Ta layer formed on the isolation layer, and a metal (M1) layer having a fcc(111) or hcp(001) crystal structure disposed on the lower Ta layer; said composite seed layer has a horizontal section formed in a plane parallel to the top surface of the bottom shield, and a second section formed proximate to said sidewalls and connected to the horizontal section;
   (e) a (R1/R2)$_x$ laminated hard bias layer having inherent PMA and formed on the composite seed layer where R1 is Co or CoFe, R2 is NiFe or NiCo, x is an integer, and wherein a thickness (t2) of each R2 layer is greater than a thickness (t1) of each R1 layer;

(f) a capping layer formed on the (R1/R2)$_x$ laminated hard bias layer;

(g) a non-magnetic separation layer formed on the capping layer and contacting the top surface of the sensor element; and (h) a top shield on the non-magnetic separation layer that is electrically connected to the bottom shield through the non-magnetic separation layer and sensor element.

2. The magnetic read head of claim 1 wherein x is from about 10 to 70, the thickness t1 is from about 0.5 to 5 Angstroms, and the thickness t2 is between about 2 and 10 Angstroms.

3. The magnetic read head of claim 1 wherein the lower Ta layer has a thickness from about 5 to 100 Angstroms and the metal (M1) layer with fcc(111) or hcp(001) crystal orientation has a thickness between about 10 to 100 Angstroms and is comprised of Ru, Cu, or Au.

4. The magnetic read head of claim 1 wherein the composite seed layer is further comprised of a metal layer M2 that is one of Cu, Ti, Pd, W. Rh, Au, or Ag and formed on the M1 layer to give a Ta/M1/M2 configuration in which the lower Ta layer thickness is from about 5 to 100 Angstroms, the M1 layer thickness is between about 10 and 100 Angstroms, the metal M2 layer thickness is from about 1 to 100 Angstroms, and M1 is unequal to M2.

5. The magnetic read head of claim 1 wherein the non-magnetic separation layer is comprised of Ru and has a thickness between about 15 and 100 Angstroms.

6. The magnetic read head of claim 1 wherein the capping layer is comprised of Ta and has a thickness from about 40 to 80 Angstroms.

7. The magnetic read head of claim 1 wherein CoFe has a composition by $Co_{(100-w)}Fe_w$ where w is from 0 to about 90 atomic %, NiFe has a composition represented by $Ni_{(100-y)}Fe_y$ where y is from 0 to about 50 atomic %, and NiCo has a composition represented by $Ni_{(100-z)}Fe_z$ where z is from 0 to about 50 atomic %.

* * * * *